United States Patent [19]

Okamoto et al.

[11] Patent Number: 4,767,302
[45] Date of Patent: Aug. 30, 1988

[54] EXCHANGEABLE MULTIPLUNGER TRANSFER MOLDING DIE APPARATUS

[75] Inventors: Hiroyuki Okamoto; Takao Sagawa; Yukio Shibata, all of Shizuoka, Japan

[73] Assignee: Yazaki Corporation, Japan

[21] Appl. No.: 101,196

[22] Filed: Sep. 25, 1987

[30] Foreign Application Priority Data

Sep. 26, 1986 [JP] Japan .................................. 61-226259
Sep. 26, 1986 [JP] Japan .................................. 61-226260
Sep. 29, 1986 [JP] Japan .................................. 61-228088
Sep. 29, 1986 [JP] Japan .................................. 61-228089

[51] Int. Cl.$^4$ ............................................. B29C 45/02
[52] U.S. Cl. .................................... 425/190; 264/40.5; 264/297.2; 264/328.4; 264/328.7; 425/398; 425/419; 425/556; 425/574; 425/588
[58] Field of Search .............. 264/40.5, 297.2, 328.4, 264/328.7, 328.8; 425/182, 190, 398, 556, 574, 575, 588, 193, 185, 419, 447

[56] References Cited

U.S. PATENT DOCUMENTS

4,544,340 10/1985 Hehl .................................... 425/190
4,632,653 12/1986 Plocher .............................. 425/588

Primary Examiner—Jay H. Woo
Assistant Examiner—Timothy W. Heitbrink
Attorney, Agent, or Firm—Wigman & Cohen

[57] ABSTRACT

In a conventional multiplunger transfer molding die apparatus having plungers for pressurizing molding material put in plural material supply pots formed in each mated surface of upper and lower chase blocks, when the pitch of the material supply pots is required to change, the whole die apparatus has been exchanged, thus a complicated adjustment work of the plunger pitch, a broad die storage space, an uneconomical die apparatus preparation being required. To overcome these problems, only the upper and lower chase blocks are exchanged and the pitch of plungers is adjusted according to the replaced chase blocks by means of locating means.

11 Claims, 9 Drawing Sheets

EXCHANGEABLE MULTIPLUNGER TRANSFER MOLDING DIE APPARATUS

BACKGROUND OF THE INVENTION

1. Field of the Invention

The present invention relates generally to an exchangeable multiplunger transfer molding die apparatus and more specifically to a die apparatus exchangeably mounted on a multiplunger transfer molding machine without exchanging plungers and a constant pressure applying device.

2. Description of the Prior Art

To seal semiconductor devices with resin, a semiconductor device is set within a cavity formed in a metallic die and then a heated soft resin is inserted into the cavity under pressure to harden the inserted resin around the semiconductor device. In the above-mentioned process, transfer molding method is usually adopted. In this method, since resin is fed to dies through slender gates, heating or hardening of products is uniform; hardening time is short; dimension precision is high without damaging or deforming semiconductor devices.

Figure 1A:
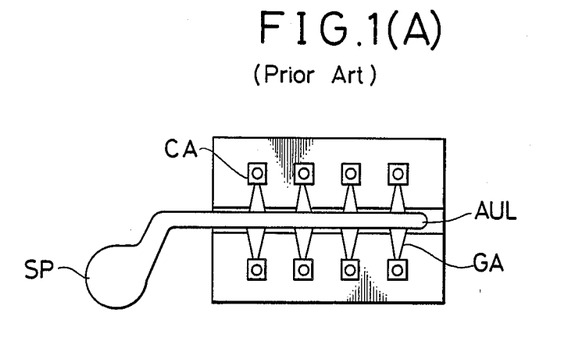
FIG. 1(A) is a plan view showing a die surface of a prior-art lower die.
Figure 1B:
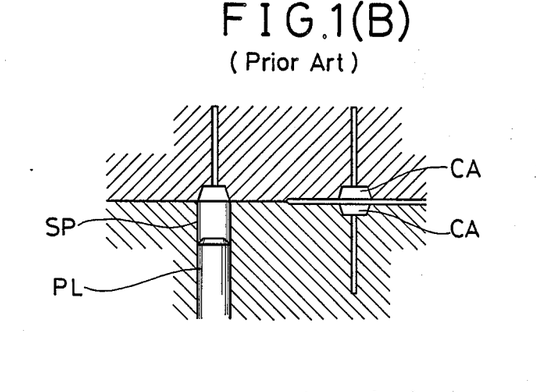
FIG. 1(B) is an enlarged cross-sectional view showing a part of the contact surfaces of the prior-art upper and lower dies.

FIGS. 1(A) and 1(B) illustrate an example of the transfer molding method, in which heated resin is pressurized by a plunger PL and fed from a supply pot SP to cavities CA through an auxiliary liner AUL and gates GA to surround products by resin remaining within the cavities CA. In this method, however, since other residual resin material is not available again, there exists a problem in that the yield of resin material is not satisfactory.

Figure 2A:
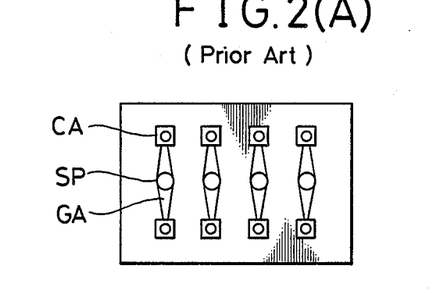
FIG. 2(A) is a plan view showing a die surface of another prior-art lower die.

To overcome this problem, so-called multiplunger transfer molding dies have been proposed as shown in FIG. 2(A), in which a number of supply pots SP are arranged in the vicinity of cavities CA and connected to the cavities CA via gates GA and further each plunger PL is provided for each supply pot SP to supply resin material into the cavities in order to reduce material not used.

An example of a multiplunger transfer molding die will be described in further detail with reference to FIG. 2(B) under DETAILED DESCRIPTION OF THE PREFERRED EMBODIMENTS.

In the above multiplunger transfer molding die, it is possible to continuously molding the same products effectively. However, it is necessary to exchange the molding die whenever other products are required to be molded. In the multiplunger transfer molding die, since the number of cavities formed in a die is different according to products to be molded and therefore the pitch of the resin supply pots SP is also different between products, it is necessary to change the die and simultaneously the pitch of the plungers each for applying pressure to material in each supply pot SP.

However, it is not easy to change the pitch of the plungers and it takes much time to set new plungers to the molding machine, because it is very troublesome to remove the constant pressure applying device from the machine and correctly locate the multiplunger again on the molding machine in concentric positional relationship to the supply pots.

Conventionally, therefore, whenever new products are required to mold, the entire die apparatus is completely exchanged to reduce die setting time. However, when a number of expensive die apparatus are prepared, there arise other problems such that the economic loss is great; the die storage space is broad; and the die exchange work is inefficient, thus increasing molding cost and decreasing molding productivity.

SUMMARY OF THE INVENTION

With these problems in mind, therefore, it is the primary object of the present invention to provide an exchangeable multiplunger transfer molding die apparatus by which upper and lower mated chase blocks can be exchanged easily and further plunger pitch can be adjusted without exchanging plungers and the constant pressure applying device.

To achieve the above-mentioned object, an exchangeable multiplunger transfer molding die apparatus according to the present invention comprises: (a) a first master die holder; (b) a first chase block slidably and removably engaged with said first master die holder; (c) a second master die holder associated with said first master die holder; (d) a second chase block slidably and removably engaged with said second master die holder; (e) a frame member for supporting said first and second master die holders; (f) a plurality of plungers for pressurizing molding material put in plural material supply pots formed in each mate surface of said first and second chase blocks; (g) a base member supported by a hydraulic cylinder movable up and down; (h) a plurality of constant pressure applying members mounted on said base member, for supporting said plungers to supply a constant pressure to each plunger; and (i) locating means (102, 102A, LCA) attached to said base member, for locating and locking said constant pressure applying members on said base member adjustably according to pitches of said plungers whenever said first and second chase blocks are exchanged.

The locating means is a locating member having a plurality of comb-shaped partitions and two side-end jaws fittable to the base member, or a locating member having a plurality of holes and two side-end jaws also fittable to the base member.

To automatically adjust the plungers, the locating apparatus comprises a stopper for selectively locking the constant pressure applying member by a spring into a locate groove formed in the base member when released; a hydraulic cylinder for urging the stopper into unlock condition when actuated; a nut member for supporting the hydraulic cylinder, and a screw rod engaged with the nut, for moving the nut member to and fro when rotated by a motor in response to command signals to move the unlocked stopper along the base member to another locate groove according to pitches of the plunger.

In the die apparatus according to the present invention, the multiplungers are located and locked by the locating means according to a required pitch. The upper and lower chase blocks each including ejector plate can be removed from and exchanged to the upper and lower master die holders in cassette fashion without exchanging the entire die apparatus.

Further, since at least one slot is formed in the lower master die holder and the lower frame, the plungers can be movably adjusted therein. Furthermore, it is also possible to extract the plungers from the machine along a slide guide plate to facilitate the adjustment work of the plungers.

BRIEF DESCRIPTION OF THE DRAWINGS

The features and advantages of a die apparatus for a multiplunger transfer molding machine according to the present invention will be more clearly appreciated from the following description of the preferred embodiments of the invention taken in conjunction with the accompanying drawings in which like reference symbols and numerals designate the same or similar elements or sections throughout the figures thereof and in which:

FIG. 9(A)-1 is a front view, partially cross-sectional view, showing another embodiment of the locking means of the die apparatus of the present invention, in which locked conditions are shown;

FIG. 9(A)-2 is a cross-sectional view, partially side view, of the same locking means shown in FIG. 9(A)-1;

FIG. 9(B)-1 is a partial front view, partially cross-sectional view, showing the same locking means, in which unlocked conditions are shown;

FIG. 9(B)-2 is a cross-sectional view, partially side view, of the same locking means shown in FIG. 9(B)-1;

DESCRIPTION OF THE PREFERRED EMBODIMENTS

To facilitate understanding of the present invention, a brief reference will be made to a prior-art multiplunger transfer die apparatus, with reference to the attached drawings.

Figure 2B:
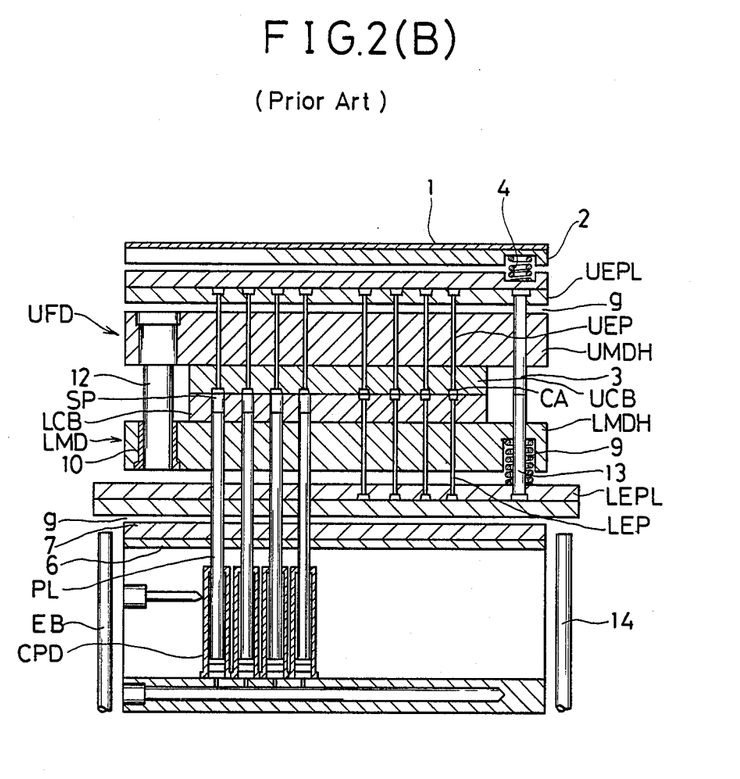
FIG. 2(B) is a cross-sectional view of a prior-art multiplunger transfer molding die apparatus.

In FIG. 2(B), the die apparatus is composed of an upper fixed die UFD and a lower movable die LMD. The upper die UFD comprises a heat insulating plate 1, and upper die mounting plate 2 fixed to the plate 1, an upper ejector plate UEPL a compression spring 4 disposed between the two plates 2 and UEPL, an upper master die holder UMDH with a gap g under the upper ejector plate UEPL, and an upper chase block UCB formed with cavities CA and fixed to the upper master die holder UMDH. Further, upper ejector pins UEP passing through the upper master die holder UMDH and the upper chase block UCB are fixed to the upper ejector plate UEPL at top thereof and loosely fitted to the cavities CA and the supply pots SP. Furthermore, an upper return pin 3 passing through the upper die holder UMDH is fixed to the ejector plate UEPL.

The lower die LMD comprises a heat insulating plate 6, a lower die mounting plate 7 fixed to the plate 6, a lower ejector plate LEPL having a gap g over the plate 7, a lower master die holder LMDH having a gap over the plate LEPL, a compression spring 9 disposed between the ejector plate LEPL and the die holder LMDH and a lower chase block LCB fixed to the lower master die holder LMDH. Further, a guide pin 12 fixed to the upper master die holder UMDH is fitted to a bush 10 provided for the lower master die holder LMDH.

In FIG. 2(B), the reference symbol PL denotes plungers disposed passing through the lower master die holder LMDH and the lower chase block LCB so as to apply pressure to the resin supply pots SP formed in the lower chase block LCB by means of a constant pressure applying device CPD. Lower ejector pins LEP passing through the lower chase block LCB and the lower master die holder LMDH are fixed to the lower ejector plate LEPL so as to be inserted into or retracted from the cavities CA. A lower return pin 13 is fixed to the lower ejector plate LEPL so as to be in contact with the upper return pin 3.

Further, the reference symbol 14 denotes an eject bar for urging the lower ejector plate LEPL in the upward direction.

To seal semiconductor devices with resin by means of the prior-art molding die apparatus, the upper and lower dies are opened to set semiconductor devices in the cavities CA; resin material is inserted into the resin supply pots SP; and the two dies are closed; the plungers PL are moved upward by means of the constant pressure applying device CPD to insert resin material into the cavities CA under pressure; and the material is heated and hardened around the semiconductor devices.

Thereafter, when the two dies are opened, the upper ejector pins UEP and the lower ejector pins LEP urged by the compression springs 4 and 9 and the ejector bar 14 are inserted into the cavities CA to remove the molded products from the cavities CA.

In the prior-art multiplunger transfer molding die apparatus for a transfer molding machine, the entire die apparatus should be exchanged as already explained hereinbefore whenever new products are to be molded, thus a complicated plunger pitch adjustment work, a large die storage space, and an uneconomical die apparatus preparation being inevitably required.

In view of the above description, reference is now made to embodiments of a die apparatus according to the present invention, with reference to the attached drawings.

Figure 3A:
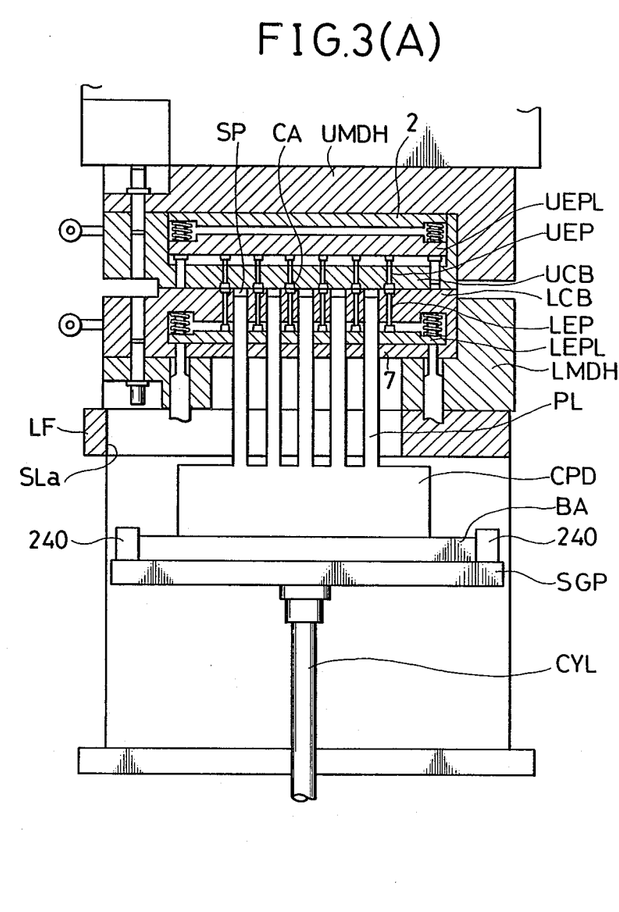
FIG. 3(A) is a front cross-sectional view showing an exchangeable multiplunger transfer molding die apparatus of the present invention.
Figure 3B:
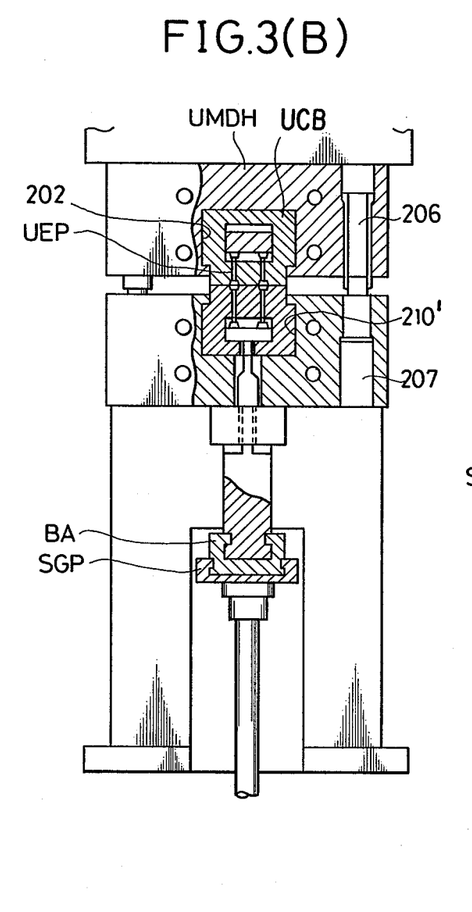
FIG. 3(B) is a side cross-sectional view showing the same apparatus shown in FIG. 3(A)

FIGS. 3(A) and (B) show a die apparatus for a transfer molding machine of the present invention, in which the upper chase block UCB, the upper ejector plate UEPL and the upper die mounting plate 2 are assembled together and removably fitted to the upper master die holder UMDH, while the lower chase block LCB, the lower ejector plate LEPL, and the lower die mounting plate 7 are also assembled together and removably fitted to the lower master die holder LMDH.

That is, the first feature of the die apparatus according to the present invention is to allow the upper and lower chase blocks UCB and LCB to be exchangeable from or to the upper and lower master die holders UMDH and LMDH.

Figure 4:
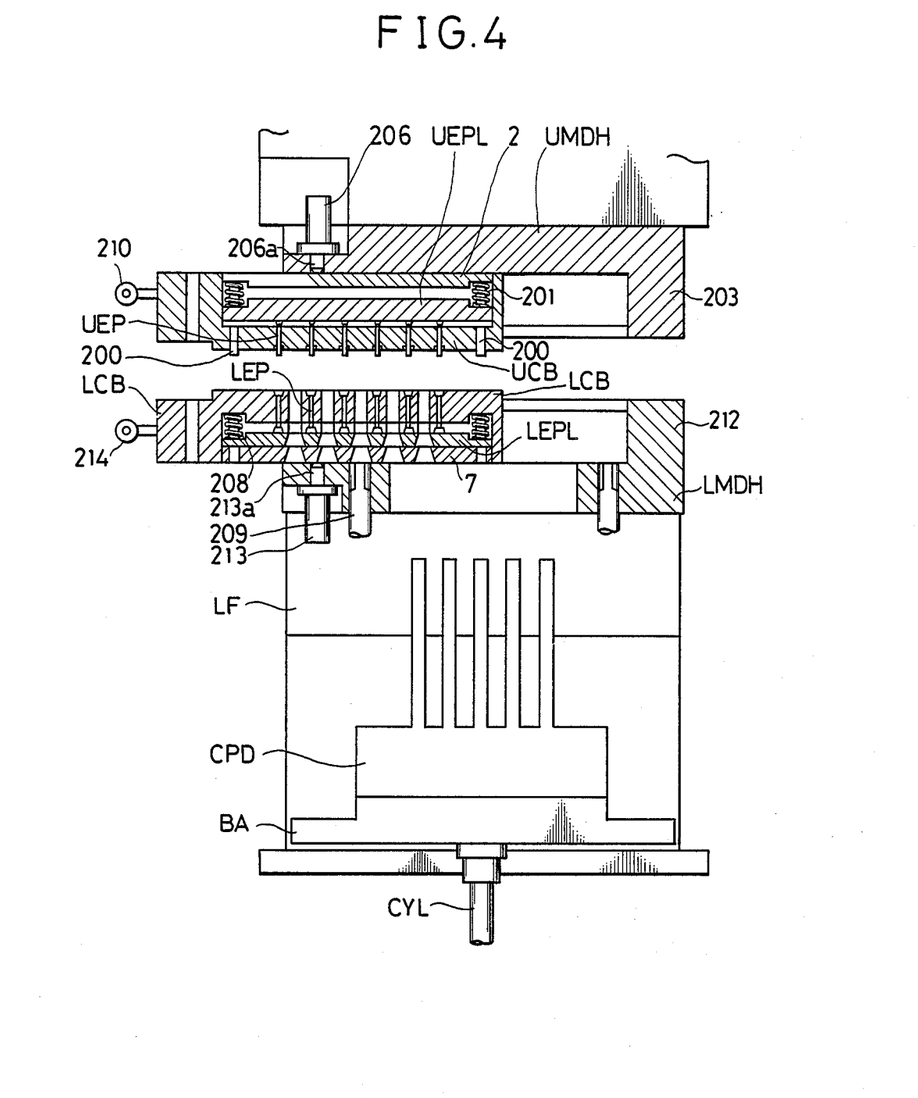
FIG. 4 is a cross-sectional view showing the multiplunger transfer molding die apparatus of the present invention, in which upper and lower chase blocks are unlocked.

With reference to FIG. 4, two upper ejector posts 200 fitted to through holes formed in the upper chase block UCB are fixed to the upper ejector plate UEPL at both the ends thereof, so that the upper chase block UCB is movable up and down along the upper ejector posts 200 relative to the upper die mounting plate 2. To the upper ejector plate UEPL, the upper ejector pins UEP to be inserted into each cavity CA formed in the chase block UCB are fixed. The ejector plate UEPL is urged downward by two springs 201.

The upper chase block UCB is slidably fitted to a T-shaped groove 202 (FIG. 3B) formed in the upper master die holder UMDH and located by a stopper 203 (FIG. 4) formed at the side end of the upper master die holder UMDH.

Figure 5:
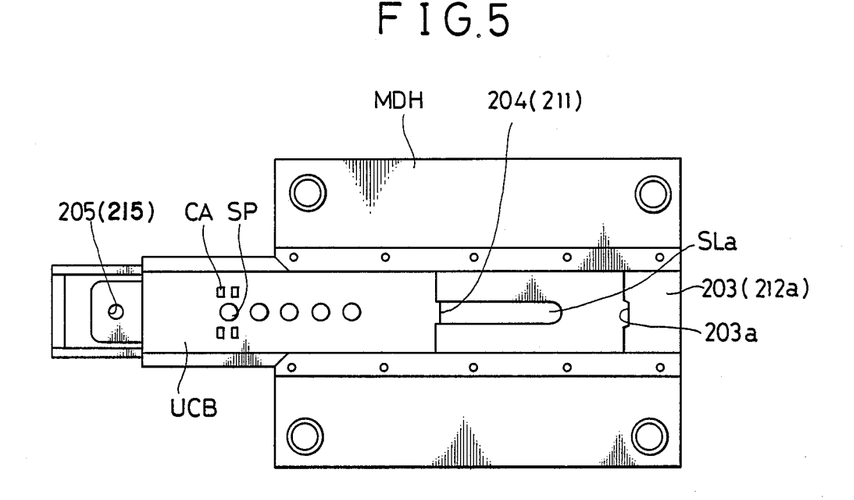
FIG. 5 is a top view showing the chase block and a master die holder of the die apparatus according to the present invention.

With reference to FIG. 5, a locating recess 203a is formed at the inner surface of the stopper 203. Therefore, when a convex portion 204 formed at the rightward end surface of the upper chase block UCB is engaged with the locating recess 203a, the upper chase block UCB can be correctly located.

A hole 205 is formed at the leftward end of the upper chase block UCB. Therefore, when the upper chase block UCB is fitted to the groove 202 (FIG. 3B) to a position where the chase block UCB is brought into contact with the stopper 203, a piston pin 206a (FIG. 4) of the hydraulic cylinder 206 fixed to the upper master die holder UMDH is inserted into a hole 205 to lock the upper chase block UCB to the upper master die holder UMDH.

An upper die guide post 206 (FIG. 3B) fixed to the upper master die holder UMDH is engaged with a lower guide post 207 (FIG. 3B) fixed to the lower master die holder LMDH to align the upper and lower dies when closed as shown in FIG. 3(B).

A handle 210 (FIG. 4) is attached at the leftward end of the upper chase block UCB to exchange the upper die.

The lower chase block LCB can be located in quite the same way as in the upper chase block UCB.

In more detail, lower ejector pins LEP are fixed to the lower ejector plate LEPL and urged by spring 208 downward.

The numeral 209 (FIG. 4) is a lower ejector post for raising the lower ejector plate LEPL upward. The lower chase block LCB is slidably fitted to a groove 210' (FIG. 3B) formed in the lower master die holder LMDH mounted on the lower frame LF. A convex portion 211 (FIG. 5) of the lower chase block LCB is brought into contact with a recessed portion 212a of a stopper 212 of the lower master die holder LMDH. Similarly, the lower chase block LCB is located and locked when a piston pin 213a (FIG. 4) of a hydraulic cylinder 213 is fitted to a hole 215 (FIG. 5).

A handle 214 is attached to the leftward end of the lower chase block LCB to exchange the lower die.

Figure 6:
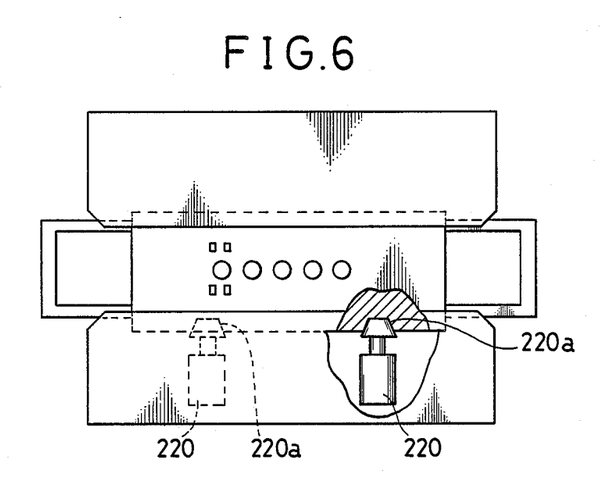
FIG. 6 is a similar top view showing the chase block and the master die holder of another embodiment of the die apparatus of the present invention.

FIG. 6 shows a modification of the exchangeable chase blocks, in which no stopper means is provided. That is, two hydraulic cylinders 220 are fixed to each of the upper and lower master die holders UMDH and LMDH. Each cylinder 220 actuates each piston 220a formed with a tapered head as shown in FIG. 6. The tapered head 220a is engaged with each tapered recessed portion formed on the side surface of each of the upper and lower chase blocks UCB and LCB in order to simultaneously locate and lock the chase block.

As described above, in the die apparatus according to the present invention, since the upper and lower chase blocks can be exchanged from the master die holders, it is possible to economize die exchange time and reduce die storage space.

After the upper and lower dies have been opened, the two dies are removed by pulling the two handles 210 and 214, and new dies are fitted to the two master die holders. In this case, the pitch of the cavities may be different from the preceding dies.

The second features of the present invention is to allow the plunger pitch to be adjustable according to the cavity pitch of the newly set dies.

In more detail, with reference to FIGS. 3(A) and (B), the plungers PL are supported on the constant pressure applying device CPD, and loosely fitted to through holes formed in the lower ejector plate LEP and the lower chase block LCB as depicted in FIG. 3(A). The plungers PL are moved up and down when a lower transfer cylinder CYL attached to the lower surface of the constant pressure device CPD is actuated or deactuated.

In FIGS. 3(A) and (B), although the plungers PL are disposed on the lower die, it is of course possible to install the plungers on the upper die or on both the upper and lower dies. Further, the cylinder CYL is moved up and down by thread or an electric powered jack. In molding process, resin material is put in each supply pot SP formed on top of each plunger. After the two dies are closed, the inserted resin is pressure-fed into the cavity CA when the lower cylinder moves in the upward direction to raise the plunger.

To exchange dies, the upper chase block UCB and the lower chase block LCB are exchanged. In this case, since the pitch of the supply pots SP may change, it is necessary to adjustably fix the plungers PL so as to be located coaxially with the supply pots SP of the newly exchanged die apparatus.

Figure 7A:
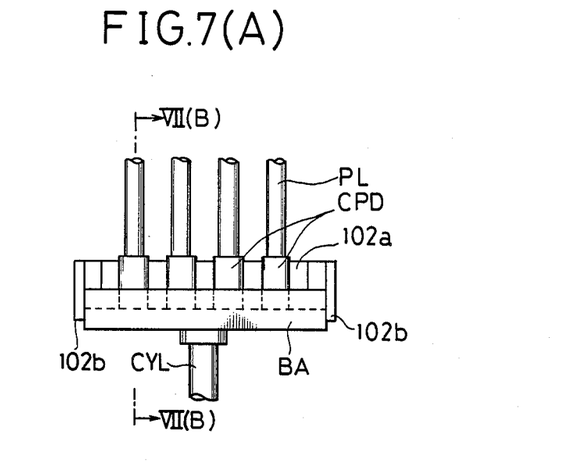
FIG. 7(A) is a front view showing a constant pressure applying device and a locating member of the die apparatus of the present invention.
Figure 7B:
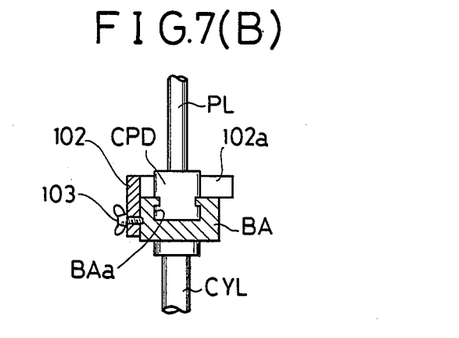
FIG. 7(B) is a side cross-sectional view of the same device and member shown in FIG. 7(A)
Figure 7C:
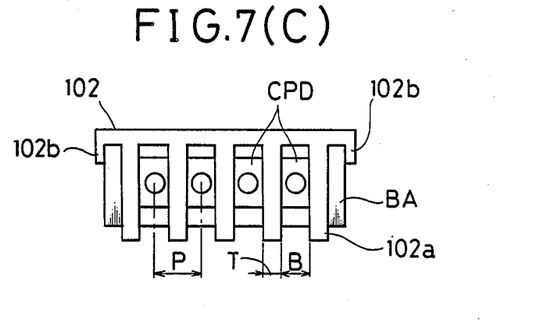
FIG. 7(C) is a top view of the same device and member shown in FIG. 7(A)

To facilitate locating of the plungers, the die apparatus of the present invention is provided with a plunger locating member, as shown in FIGS. 7(A) to (C).

A constant pressure device CPD of the present invention is slidably inserted to a reverse T-shaped slide groove BAa formed in a base BA mounted on the upper surface of the lower transfer cylinder CYL. The reference numeral 102 denotes a plunger locating member for locating the plungers. The locating number 102 is formed with a number of comb-shaped partitions 102a (between which each of the constant pressure device 100 is tightly fitted) and with two end jaw portions 102b (between which the base BA is fitted). The thickness T of the partitions 102a is determined as $T=P-B$, where P denotes a pitch of the constant pressure device CPD and B denotes a gap between teeth of the locating member 102.

Therefore, in order to locate the constant pressure device CPD at a predetermined pitch P, the locating member 102 formed with partitions 102a with a thickness T and spaced at regular intervals B is fitted to the constant pressure device CPD and the base BA at a single process.

Further, the fitted locating member 102 is fixed to the base BA with bolts 103 as depicted in FIG. 7(B).

Since the locating member 102 can be correctly located relative to the base BA by the two jaw portions 102b, the constant pressure device CPD can be correctly located on the base BA. Further, when the pitch P is changed to $P_1$, the thickness $T_1$ of the partitions 102a should be changed as $T_1=P_1-B$.

Figure 8A:
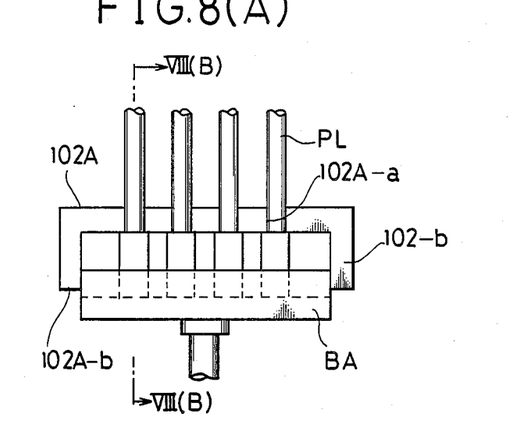
FIG. 8(A) is a front view showing the constant pressure applying device and another modification of the locating member of the die apparatus of the present invention.
Figure 8B:
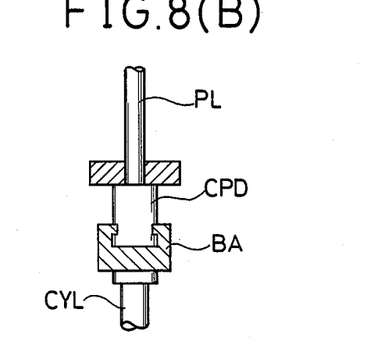
FIG. 8(B) is a side cross-sectional view of the same device and member shown in FIG. 8(A)
Figure 8C:
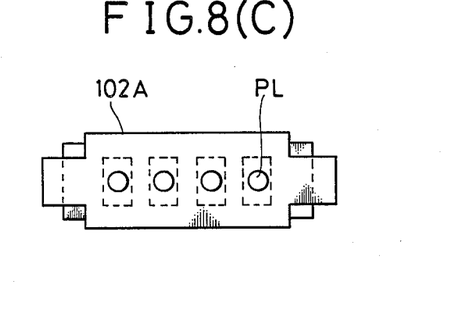
FIG. 8(C) is a top view of the same device and member shown in FIG. 8(A)

FIG. 8(A) to (C) shows a first modification of the plunger locating member, in which a locating member 102A is formed with holes 102A-a to which plungers PL are fitted and two jaw portions 102A-b to which the base BA is fitted. The pitch of the holes 102A-a is equal to that of the constant pressure device CPD.

Figure 9A:
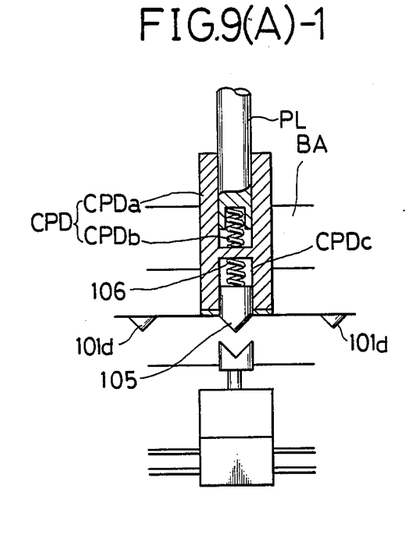

FIG. 9(A)-1 (front view), 9(A)-2 (cross-sectional view), 9(B)-1 and 9(B)-2 show a second modification of the plunger locating means for adjusting a pitch of the plungers under automatic numeric control.

Figure 9A:
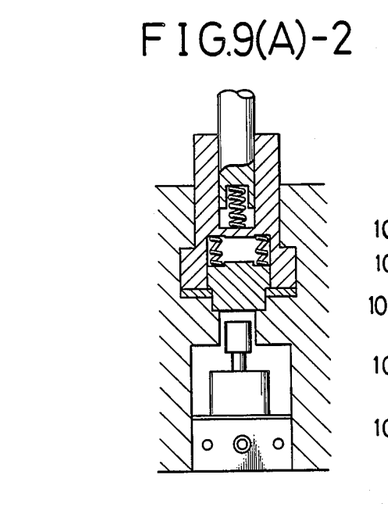

The constant pressure applying device CPD comprises a plunger support CPDa to which the plunger PL is fitted and a spring CPDb disposed between the plunger PL and the plunger support CPDa. The plunger support CPDa is formed with a cylindrical opening CPDc to which a stopper 105 is fitted. The stopper 105 is formed into a wedge shape at the lower end, and another spring 106 is disposed between the plunger support CPDa and the upper surface of the stopper 105.

The constant pressure device CPD is fitted to a reverse T-shaped slide groove 101a of the base BA so as to be slidable on a stopper fixing plate 106 fixed in the slide groove 101a. The stopper fixing plate 106 engages with two recessed portions 105a formed on the lower portion of the stopper 105 on both the side surfaces thereof to support the stopper 105 urged by the spring 106 in the downward direction.

The base BA is formed with a space 101b and a space 101a and a locating groove 101d. The locating groove 101d is the same in shape as the wedge of the stopper 105. Here, it should be noted that a plurality of locating grooves 101d are arranged at regular intervals (pitch) along the longitudinal direction of the T-shaped slide groove 101a to locate the plungers PL in digital fashion.

Further, a screw drive unit 107 is disposed within the space 101c. The screw drive unit 107 is composed of a screw rod 107a extending along the slide groove 101a, two guide rods 107b, and a nut member 107c. This screw rod 107a is driven by a motor (not shown) under numerical control. A hydraulic cylinder 108 is fixed on the upper surface of the nut member 107c. A piston rod 108a formed with the wedge shape (the same as that of the stopper 105) is actuated by the cylinder 108.

The operation of the plunger locating means as described above will be described.

As shown in FIGS. 9(A)-1 and 9(A)-2, the constant pressure device CPD is first located or fixed in such a way that the plunger support CPDa is fitted to the slide groove 101a, and the stopper 105 is fitted to the locating groove 101d. To change the position of the constant pressure device CPD whenever the die is exchanged, the lower transfer cylinder CYL (shown in FIG. 4), is lowered to separate the plungers PL from the die, and then the motor is driven on the basis of the numerical control to rotate the screw rod 107a so that the nut member 107c is moved and positioned under the constant pressure device CPD. Thereafter, the cylinder 108 is driven upward to bring the stopper 105 away from the locating groove 101d against the spring 106 via the piston rod 108a. Under these conditions, the constant pressure device CPD is slidable along the slide groove 101a formed in the base BA.

Figure 9B:
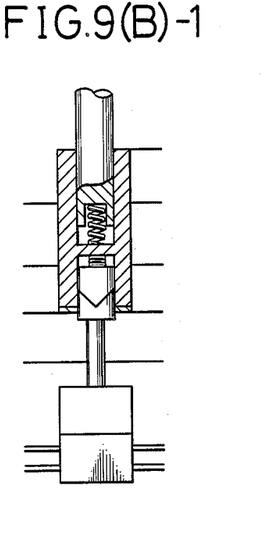
Figure 9B:
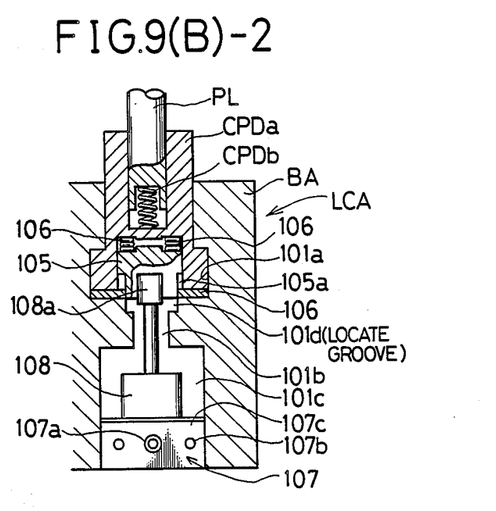

Subsequently, a motor drives the screw 107a on the basis of the control command to bring the nut member 107c to just under a desired locate groove 101d. Since the piston rod 108a is kept upward, the constant pressure device CPD is moved together with the nut member 107c.

Thereafter, the piston rod 108a is lowered to engage the stopper 105 into the locate groove 101d by the spring 106 in order to locate the constant pressure device CPD at a predetermined position of the base BA. The pitch of the other plungers PL is adjusted so as to be located just under the supply pots SP of an exchanged die by locating each constant pressure device at each locate groove 101d formed in the slide groove 101a of the base BA.

In the plunger locating means of the present invention, the plungers and the constant pressure device can be adjustably located quickly by means of light and small locating member or means at high precision under numerical control. Therefore, it is possible to reduce die cost and die strange space.

The third feature of the exchangeable die apparatus according to the present invention is to provide at least one slot in the lower master die holder LMDH and a lower die frame LF which supports the lower master die support LMDH.

Figure 10A:
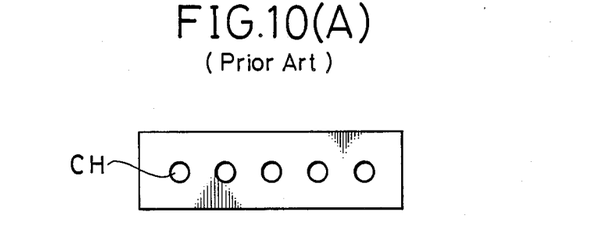
FIG. 10(A) is a top view showing the master die holder or the lower frame of a prior art apparatus.

In the conventional die apparatus, the lower chase block LCB, the lower ejector plate LEPL, the lower master die holder LMDH and the lower die frame LF are each formed with a plurality of circular holes CH for each plunger PL as shown in FIG. 10(A).

Figure 10B:
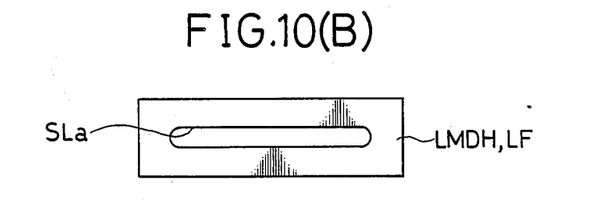
FIG. 10(B) is a top view showing the master die holder or the lower frame of the die apparatus of the present invention.

In the present invention, the lower chase block LCB and the lower ejector plate LEPL are formed with the same circular holes, as is conventional, so that the plungers PL can be passed. However, the lower master die holder LMDH and the lower die frame LF are formed with a single slot SLa as shown in FIG. 10(B). The slot width is determined so that various exchanged plungers PL can be slidably guided therein and the slot length is determined so that various exchanged plungers PL can be adjustably moved therein.

Figure 10C:
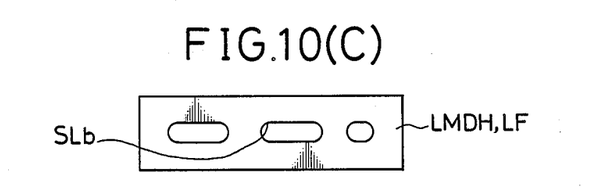
FIG. 10(C) is a similar top view showing another modification of the master die holder or the lower frame of the die apparatus of the present invention.

However, since it is unnecessary to form hollow portion at which various exchanged plungers PL will not interfere with the lower master die holder LMPH, it is also possible to form a plurality of slots SLb as shown in FIG. 10(c) in the lower master die holder LMDH and the lower die frame LF in order not to reduce the strength thereof. Therefore, even when the plunger pitch is changed, it is unnecessary to exchange the lower master die holder and the lower die frame even when the plungers PL are not sufficiently lowered away from the lower die frame LF, thus reducing the downward stroke of the plungers PL.

A lower frame LF is formed with a slot SLa, and the lower master die holder LMDH is also formed with a slot SLa. The plungers PL are passed and guided through these slots SLa and other circular holes formed in the lower chase block LCB and the lower ejector plate LEPL. The plungers PL are moved up and down by the lower transfer cylinder CYL via the constant pressure device CPD.

To exchange the die thus constructed, the upper and lower dies are opened; the plungers PL are lowered via the lower transfer cylinder CYL; two piston pins 206a and 213a (FIG. 4) of the cylinders 206 and 213 are moved downward so as to be brought away from the holes 205 and 214 (FIG. 5) to release the engagement between the upper chase block UCB and the lower chase block LCB.

Thereafter, two chase blocks UCB and LCB are extracted along the grooves 202 and 210 (FIG. 3B) by use of the handles 210 and 214 as shown in FIG. 4.

A new upper chase block UCB is inserted into the groove 202 until being brought into contact with the stopper 203. When the convex portion 204 of the upper chase block UCB is fitted to the recessed portion 203a of the stopper 203, the upper chase block UCB can be located correctly. Then, the cylinder 206 is actuated to engage the piston pin 206a with the hole 205, so that the upper chase block UCB is locked.

The lower chase block LCB can be located and locked in quite the same way.

The fourth feature of the exchangeable die apparatus of the present invention is to extract the plungers PL and the constant pressure device CPD together with a base BA (FIG. 3A) along a slide guide plate SGP.

In more detail, the constant pressure device CPD on which the plungers PL are arranged is mounted on the base BA slidably movable along the slide guide plate SGP supported by the cylinder CYL.

Therefore, after the upper and lower chase blocks UCB and LCB have been exchanged, the base BA is lowered; the lower frame LF is removed; a pair of fixing blocks 240 (FIG. 3A) are removed to pull out the base BA along the slide guide plate SGP. Then, the pitch of the plunger PL can be adjusted outside the die apparatus on the base BA, before inserted again into the die apparatus.

Further, since the plungers PL can be pulled outside, this is convenient to exchange a plunger head attached at top of the plunger, after the plunger head made of an abrasion-resistant material has been worn off or damaged.

What is claimed is:

1. An exchangeable multiplunger transfer molding die apparatus which comprises:
    (a) a first master die holder;
    (b) a first chase block slidably and removably engaged with said first master die holder;
    (c) a second master die holder associated with said first master die holder;
    (d) a second chase block slidably and removably engaged with said second master die holder;
    (e) a frame member for supporting said first and second master die holders;
    (f) a plurality of plungers for pressurizing molding material put in plural material supply pots formed in each mate surface of said first and second chase blocks;
    (g) a base member supported by a hydraulic cylinder movable up and down;
    (h) a constant pressure applying member mounted on said base member, for supporting said plungers to supply a constant pressure to each plunger; and
    (i) locating means attached to said base member, for adjustably locating and locking said constant pressure applying members on said base member according to changes in pitch of said plungers whenever said first and second chase blocks are exchanged.

2. The exchangeable multiplunger transfer molding die apparatus as set forth in claim 1, wherein said locating means is a locating member having a plurality of comb-shaped partitions with a regular pitch between said partitions, wherein said constant pressure applying members are disposed and two side-end jaws fittable to said base member.

3. The exchangeable multiplunger transfer molding die apparatus as set forth in claim 1, wherein said locating means is a locating member, said locating member having a plurality of holes to which said plungers are fitted and two side-end jaws fittable to said base member.

4. The exchangeable multiplunger transfer molding die apparatus as set forth in claim 1, wherein said locating means is an automatic locating apparatus including:
    (a) a stopper for selectively locking said constant pressure applying member by a spring into one of a plurality of locate grooves formed in said base member when released;
    (b) a hydraulic cylinder for urging said stopper into an unlocked condition from said base member when actuated;
    (c) a nut member for supporting said hydraulic cylinder; and
    (d) a screw rod engaged with said nut member, for moving said nut member to and fro when rotated by a motor in response to command signals to move said unlocked stopper along said base member to another locate groove according to pitches of said plunger.

5. The exchangeable multiplunger transfer molding die apparatus as set forth in claim 1, wherein each of said first and second chase blocks is located and locked by means of a stopper and a lock pin, each stopper and lock pin respectively located on each of said first and second master die holders.

6. The exchangeable multiplunger transfer molding die apparatus as set forth in claim 1, wherein each of said first and second chase blocks is located and locked by means of a piston rod with a tapered head engageable with a mated recess formed in said first and second chase blocks.

7. The exchangeable multiplunger transfer molding die apparatus as set forth in claim 1, wherein said second master die holder and said frame member are each formed with at least one slot along which said plungers are slidably movable when the pitch of said plungers is adjusted.

8. The exchangeable multiplunger transfer molding die apparatus as set forth in claim 1, wherein said base member is movable away from under said die apparatus for facilitating adjustment of the pitch of said plungers by means of said locating means.

9. The exchangeable multiplunger transfer molding die apparatus as set forth in claim 1, wherein said base member is movable away from under said die apparatus for facilitating exchange of a plunger head from said plunger.

10. The exchangeable multiplunger transfer molding die apparatus as set forth in claim 1, wherein said plungers are movable downward away from said first and second chase blocks for allowing plunger exchange.

11. An exchangeable multiplunger transfer molding die apparatus which comprises:
(a) a first master die holder;
(b) a first chase block slidably and removably engaged with said first master die holder;
(c) a second master die holder associated with said first master die holder;
(d) a secod chase block slidably and removably engaged with said second master die holder; and
(e) a frame member (LF) for supporting said first and second master die holders
(f) a plurality of plungers for pressurizing molding material put in plural material supply pots formed in each mate surface of said first and second chase blocks;
(g) a base member supported by a hydraulic cylinder movable up and down;
(h) a plurality of constant pressure applying members mounted on said base member, for supporting said plungers to supply a constant pressure to each plunger; and
(i) locating means attached to said base member, for locating and locking said constant pressure applying members on said base member adjustably according to pitches of said plungers whenever said first and second chase blocks are exchanged.

* * * * *